Dec. 28, 1937. E. W. DUNBAR Re. 20,609

SHOE

Original Filed July 18, 1934

INVENTOR:
Ernest W. Dunbar,
BY J. H. McCready,
His ATTORNEY.

Reissued Dec. 28, 1937 Re. 20,609

UNITED STATES PATENT OFFICE 20,609

SHOE

Ernest W. Dunbar, Hudson, Mass., assignor to Cambridge Rubber Co., Cambridge, Mass., a corporation of Massachusetts Original No. 2,075,432, dated March 30, 1937, Serial No. 735,759, July 18, 1934. Application for reissue November 2, 1937, Serial No. 172,410

6 Claims. (Cl. 36—30)

This invention relates to shoes and to the insole construction of shoes.

Many persons find rubber soled shoes very uncomfortable to wear. They complain that the rubber soles "burn" their feet and make them smart and sting. This is even true of those shoes having a leather insole. Such sensations are apparently caused primarily by the fact that the bottom of the shoe is substantially impervious to the passage of air and moisture, so that there is little ventilation at the bottom of the foot and accordingly, evaporation of the moisture from this part of the foot proceeds at a very low rate.

The present invention is especially concerned with these considerations. It aims to improve the construction of shoes with a view to avoiding the foregoing difficulties, and to devise an insoling material which will have a high degree of porosity, while at the same time possessing those characteristics necessary to give good wearing qualities, to unite securely with adjacent elements of a shoe, and to afford the desirable comfortable feel under the foot, in addition to avoiding the burning and smarting sensations when used in a shoe of the rubber soled type.

The nature of the invention will be readily understood from the following description when read in connection with the accompanying drawing, and the novel features will be particularly pointed out in the appended claims.

I have found that a very satisfactory insoling can be made from sisal fiber and other similar coarse fibers used in the manufacture of ropes. According to the method which I prefer at present to use, the long sisal fibers are first worked into the form of a layer or sheeted body having considerable thickness. This operation can be performed by hand or in various kinds of machinery used for the purpose of working fibers into a sheeted web or bat in which the fibers are loosely matted together. It is not desirable for the purposes of this invention to have these fibers arranged in a parallel relationship but rather to prevent such an arrangement and to have the fibers disposed promiscuously, but so distributed that when the mass is compressed a sheet or web of substantially uniform thickness will be produced. For the purpose of holding the sheeted body in suitable condition for handling and for the subsequent operations, it may be desirable to associate with the fibers a small proportion of some suitable binder. It may, for example, consist of any of the common water soluble adhesives, or, in some cases, of a water resistant adhesive, such as rubber latex. At this stage of the process, however, an adhesive of the former nature usually is preferable, and the quantity used should be only enough to hold the matted body of fibers together in the form of a layer or sheet. This sheeted product can be made in plants equipped to handle rope making fibers and then shipped to the rubber plant where the remaining manufacturing operations are to be conducted.

The sheeted stock produced in the manner above described is next impregnated with a binder adapted to bond the fibers together permanently. A flexible waterproof binder should be used for this purpose. Such a binder may be of an asphaltic nature, or may be made from some of the synthetic gums or resins and balsams, the desired flexibility being produced by the use of suitable plasticizers. I prefer, however, to use a binder of a rubbery nature. If the insoling is to be used in vulcanized shoes, then I prefer to use rubber latex as the binder. On the other hand, if the insoles are to be used in shoes which are not to be vulcanized, then I prefer to use vulcanized latex as the binder, although latex could be used and the impregnated material later could be vulcanized. The vulcanized latex, however, has the important advantage of avoiding any necessity for subsequent vulcanization.

Figure 1:
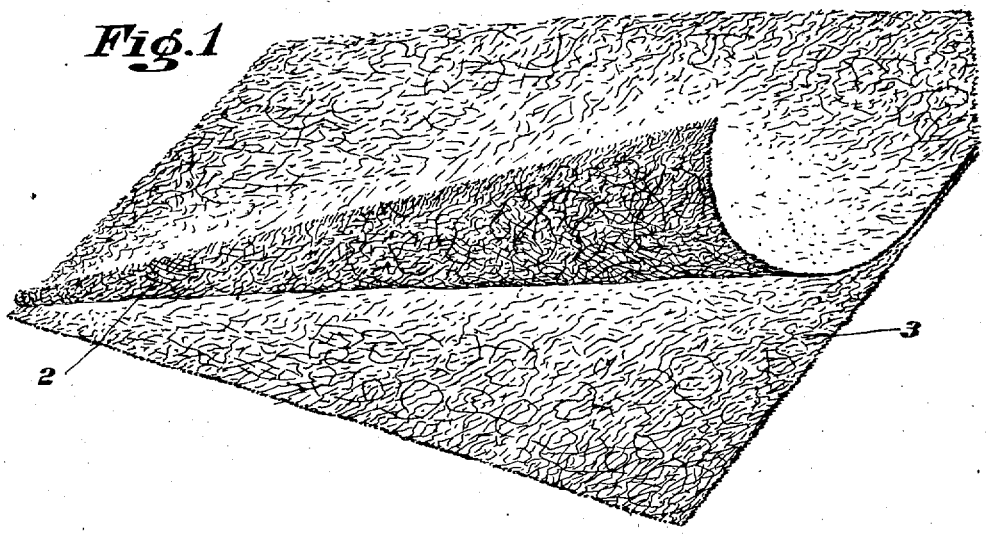
Figure 1 is a perspective view illustrating a step in the process of making insole stock according to the present invention.

The impregnating step may be performed in any convenient manner as, for example, by running the sisal fiber sheets through the liquid binder, and then through squeeze rolls to remove the surplus, after which the sheets so treated should be dried to evaporate the solvent or the dispersing liquid used. Usually it is necesary to combine two or more of these treated sheets in order to produce a fibrous body having the desired thickness for an insole, and this combining operation may conveniently be performed when the drying operation has proceeded to such a stage that most of the dispersing medium has been driven off and the surfaces of the sheets have acquired the desired degree of tackiness. At this time one sheet or web can be superposed upon another and the two run through squeeze rolls or they may be compressed in a reciprocating press of any suitable form. Fig. 1 shows two such sheets or layers of sisal fiber 2 and 3 partly combined.

While, as above stated, I prefer to use sisal fiber, a good grade of hemp fiber can be used equally as well and is an equivalent for the sisal fiber. Other coarse fibers, such as jute, and others used in the manufacture of rope, can also be substituted for part, or all, of the hemp or sisal, but they do not produce, when used alone, as satisfactory a product as do either sisal or hemp. The common textile fibers, such as cotton, are not suitable for this purpose.

The sheeted body produced in the manner described has an open reticulated structure so that air flows very freely through it. This is a highly desirable property in an insole. Naturally in impregnating, combining and compressing layers of this material to produce a sheet having the desired thickness for insoles, some of this extreme porosity is lost. However, it is entirely possible to retain an exceptionally high degree of porosity while still producing the mechanical characteristics desired in such a material, by properly controlling the quantity of binder left in the fibrous layers. Such a control may be effected by properly regulating the consistency of the impregnating liquid or bath; or, in other words, by suitably proportioning the quantity of liquid in which a given weight of solids is dispersed or dissolved. In this product, therefore, the fibers are united to each other at their crossings or intersections, but the intersticial spaces are not substantially reduced by the presence of binding material.

Figure 2:
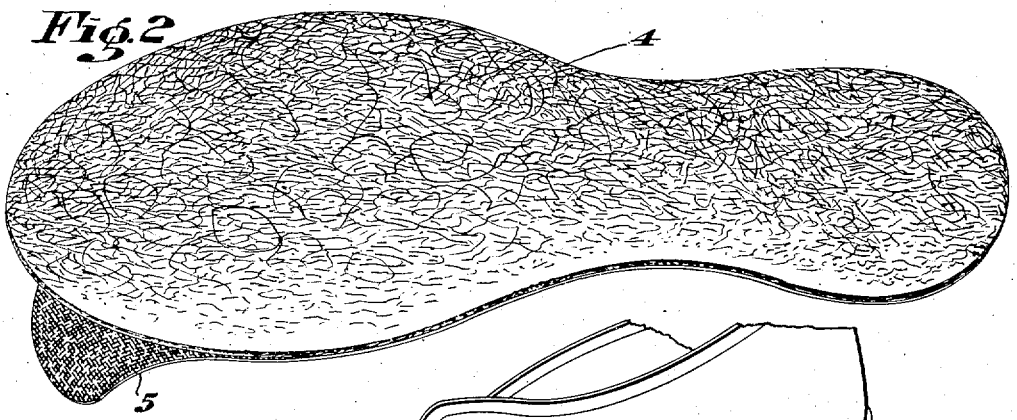
Fig. 2 is a perspective view of an insole embodying features of this invention.

After the impregnated sheet material has dried, the insoles, toe stiffeners, counter blanks, or other parts to be made from this insoling, are cut out of it, this cutting operation being performed with cutting dies. Usually it is desirable before dieing out the parts to cover one or both surfaces of the sheeted material with a suitable fabric or other cover stock. The nature of this covering material necessarily will depend upon the use to be made of the individual articles. In Fig. 2 the body 4 of the insole there shown is made of the fibrous stock illustrated in Fig. 1, and a cover sheet 5 of rubberized fabric is bonded to one surface of the body 4 by the rubber binder with which both elements are impregnated. Such an insole, and shoe stiffeners made in the same way, may be used in rubber shoes, particularly those which are to be vulcanized, in exactly this condition. Usually, however, an insole would include an upper layer of sheet material to cover the upper surface of the fibrous body 4, this material being selected primarily to give the desired feel under the foot. Such a cover sheet is shown at 6 in Fig. 3 applied to an insole of typical form and thickness. In a large percentage of cases this cover would be made of leather, but various other smooth surfaced sheet materials could be used in place of it, care being taken to see that it has the desired degree of porosity. In using some sheet materials which do not have this property, but which are desirable in other respects, the necessary porosity may be imparted to them by perforating them, as indicated in Fig. 3.

Figure 3:
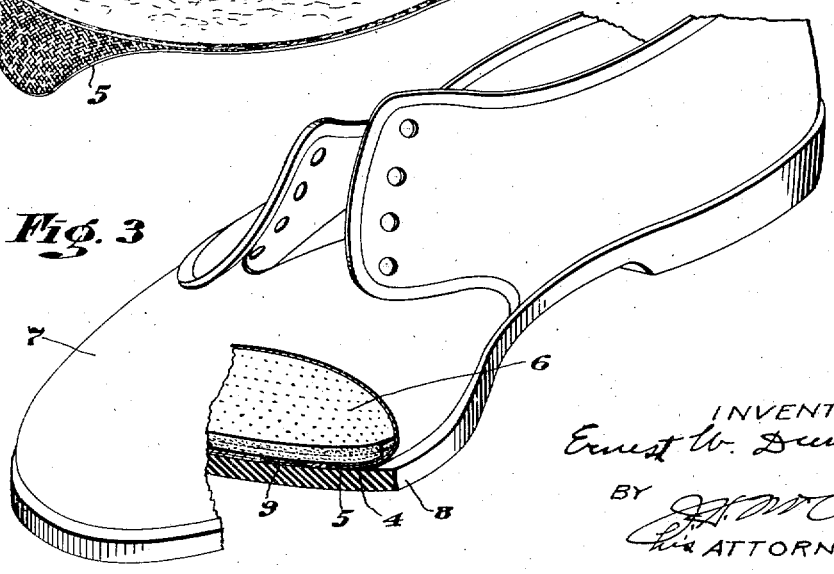
Fig. 3 is a perspective view, with parts cut away, of a shoe constructed in accordance with this invention.

The particular shoe illustrated in Fig. 3 has a fabric or leather upper 7, a rubber outsole 8, and the usual filler 9, all the parts being adhesively united as in the usual rubber shoe constructions. This, however, is simply illustrative of one type of shoe in which the insole provided by this invention is useful.

It has been demonstrated in practice that insoles, stiffeners, and the like, made in the manner above described, obviate, in a very high percentage of cases, the objection which people with sensitive feet find to wearing rubber soled shoes. Such an insole has a high degree of porosity, possesses the mechanical strength and wearing qualities required in articles of this type, and it lends itself readily to those modifications necessary to using it in different types of shoes.

While I have herein shown and described a preferred embodiment of my invention, it will be understood that the invention may be embodied in other forms without departing from the spirit or scope thereof.

Having thus described my invention, what I desire to claim as new is:

1. A shoe having a rubber outsole and an insole including a highly porous body layer of sisal fibers loosely matted together but secured to each other at their intersections by a rubber binder, said outsole being cemented to said insole.

2. A shoe comprising an upper, an outsole, and an insole including a highly porous body layer of sisal fibers loosely matted together but secured to each other at their intersections by a flexible waterproof binder, said insole being of such thickness and porosity as to maintain between the wearer's foot and the outsole a relatively thick layer of air.

3. A shoe comprising an upper, an outsole, and an insole including a highly porous body layer of sisal fibers loosely matted together but secured to each other at their intersections by a flexible waterproof binder, said insole being of such thickness and porosity as to maintain between the wearer's foot and the outsole a relatively thick layer of air, and a porous cover of sheet material bonded to the upper surface of said layer and having a smooth upper face for contact with the wearer's foot.

4. A shoe comprising an upper, an outsole, an insole including a highly porous body layer of sisal fibers loosely matted together but secured to each other at their intersections by an adhesive binder, and means securing said outsole and said insole together.

5. A shoe comprising an upper, an outsole, and an insole including a highly porous body layer of sisal fibers loosely matted together but adhesively secured to each other at their intersections by a binder, said insole being of such thickness and porosity as to maintain between the wearer's foot and the outsole a relatively thick layer of air.

6. A shoe comprising an upper, an outsole, and an insole including a highly porous body layer of sisal fibers loosely matted together but secured to each other at their intersections by an adhesive binder, said insole being of such thickness and porosity as to maintain between the wearer's foot and the outsole a relatively thick layer of air, and a porous cover of sheet material bonded to the upper surface of said layer and having a smooth upper face for contact with the wearer's foot.

ERNEST W. DUNBAR.